United States Patent
Morikawa et al.

(10) Patent No.: US 6,203,829 B1
(45) Date of Patent: Mar. 20, 2001

(54) FEED ADDITIVES FOR RUMINANTS

(75) Inventors: Takao Morikawa, Chiba; Seiji Sasaoka, Shizuoka; Shigeru Saito; Masato Sugawara, both of Kanagawa; Kaoru Muto, Chiba; Shigenori Yabuta, Toyama, all of (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 09/319,482

(22) PCT Filed: Dec. 3, 1997

(86) PCT No.: PCT/JP97/04420

§ 371 Date: Jun. 4, 1999

§ 102(e) Date: Jun. 4, 1999

(87) PCT Pub. No.: WO98/24329

PCT Pub. Date: Jun. 11, 1998

(30) Foreign Application Priority Data

Dec. 6, 1996 (JP) .................................................. 8-342583

(51) Int. Cl.⁷ .................... A23K 1/00; A23K 1/18
(52) U.S. Cl. .................. 426/89; 426/96; 426/99; 426/289; 426/648; 426/656; 426/807
(58) Field of Search .................. 426/89, 96, 99, 426/289, 807, 656, 648

(56) References Cited

U.S. PATENT DOCUMENTS

| | | | |
|---|---|---|---|
| 4,983,403 | * 1/1991 | Ardaillon et al. | 426/2 |
| 5,098,718 | * 3/1992 | Ardaillon et al. | 426/2 |
| 5,405,628 | * 4/1995 | Ueda et al. | 426/99 |
| 5,429,832 | * 7/1995 | Ueda et al. | 426/96 |
| 5,676,966 | * 10/1997 | Kitamura et al. | 424/438 |
| 5,776,483 | * 7/1998 | Morikawa et al. | 424/438 |

FOREIGN PATENT DOCUMENTS 3-280840   12/1991   (JP) .

* cited by examiner

Primary Examiner—Chhaya D. Sayala
(74) Attorney, Agent, or Firm—Dennis G. LaPointe; Louise A. Foutch; Mason & Assoc., PA

(57) ABSTRACT

The present invention is directed to rumen-bypass preparations for ruminants composed of a core preparation and a coating layer applied thereonto, characterized in that the core preparation contains from 50 to 90% by weight, based on the core preparation, of a biologically-active substance, that the active substance has been dispersed in from 10 to 50% by weight of a protective substance, and that the coating layer applied onto the core preparation is made of from at least one material selected among linear and branched, saturated and unsaturated aliphatic $C_{12-24}$ monocarboxylates, polymers insoluble in the neutral region but soluble in the acidic region, and zein. Use of protective substances originating in natural substances and being harmless to the ecological system makes it possible to obtain rumen-bypass preparations which contain biologically-active substances at a high concentration and are advantageous economically.

9 Claims, No Drawings

FEED ADDITIVES FOR RUMINANTS

FIELD OF INVENTION

The present invention relates to a feed additive and, more particularly to a rumen-bypass preparation for ruminants wherein a biologically-active substance nutritiously suitable for ruminants is dispersed in a protective substance to protect the biologically-active substance.

BACKGROUND ART

A rumen-bypass preparation for ruminants is defined as a preparation of a feed additive which comprises one or more of amino acids, vitamins and other biologically-active substances and has a specific characteristic to allow elution and absorption of said biologically-active substances in digestive organs of ruminants from their forth stomach onward while restricting the elution and microbial decomposition of said substances in their rumen.

In breeding of ruminants, it is well accepted from dietetic and clinical point of view to feed them simultaneously with a biologically-active substance contained in a rumen-bypass preparation. In practices, the incorporation of a biologically-active substance at a high concentration to a rumen-bypass preparation is economically advantageous and favorable. Where, the hardness of the preparation is very important in view of durability during the mixing process with feed and during chewing of cows. However, when increasing the concentration of a biologically-active substance in a preparation, it is required to reduce the content of a protective substance in the preparation, which has therefore made difficult to maintain rumen-bypass property and hardness of the preparation. In order to solve this problem, a protective substance having more improved property than the previous ones be inevitably required. Under the absence of such coating material, the concentration of a biologically-active substance in a matrix-type rumen-bypass preparation has been obliged to be less than 50%.

The concept and many practical examples of rumen-bypass preparations have been already publicly known, however, there is no example for a matrix-type preparation which can contain a biologically-active substance at a high concentration of more than 50%, which is known as highly-concentrated preparation in the industry. An example which uses salts of aliphatic acids (fatty acids) as a protective substance has been disclosed, however, no example, where the protective substance can contain a biologically-active substance at a high concentration of more than 50% and give good rumen-bypass property, has not been disclosed.

In Japanese Patent Laid-open No. Hei 2-163043 Gazette, a concept for a matrix-type preparation which uses fatty acid salts and a fatty compound as a protective substance compatible to those salts is disclosed, however, the concentration of a biologically-active substance contained in the preparation is lower than 10%, and wherein no concrete description on the preparation containing more than 50% of the biologically-active substance is given.

On the other hand, an example wherein calcium salt of a fatty acid and stearyl alcohol were combined and used as a protective substance at a combining rate of 58:2 (97:3) is disclosed in International Patent Open No. WO/12731, however, the concentration of a biologically-active substance is yet lower than 50%.

In Japanese Patent Laid-open No. Sho 56-154956 Gazette, a matrix-type preparation which uses fatty protective substance is disclosed, however, the content of a biologically-active substance is lower than 50% and the composition of the protective substance is different from the one given in the present invention.

In U.S. Pat. No. 5,425,963, a fatty acid salt with high purity used as a feed additive and preparing method thereof are disclosed, however, the object of this invention is different from the one of the present invention and the content of a biologically-active substance is also far different from the one of the present invention.

In Japanese Patent Publication No. Hei 3-31423, a coating method to use a fatty acid salt containing 14 or more carbons is disclosed, however, the coated-layer is a layer of a mixture containing a fatty acid salt of less than 90% and the structure of the nuclear particles are different from the one of the present invention.

Considering such difficulties remained in the prior arts, the present invention has an object to provide an economically advantageous rumen-bypass preparation which can contain a biologically-active substance at a high concentration and is using a protective substance originating in natural substance and being harmless to the ecological system, such as fats and oil, and wax.

Disclosure of the Invention

In International Patent Open No. WO/12731, the inventors of the present invention has previously disclosed a rumen-bypass preparation comprising a biologically-active substance and a matrix protective substance composed of a fatty acid salt and a fatty compound compatible to the fatty salt. Following to this disclosure, the inventors of the present invention has further found that the composition of the protective substance which allows the passage of a biologically-active substance at a high concentration through a rumen may be restricted to a limited range in comparison with a range when using a protective substance at a low concentration and that only an use of a coating matrix comprising an aliphatic monocarboxylate and either of an aliphatic carboxylic acid or an aliphatic alcohol, which are combined at a specific composition rate, allows to prepare a rumen-bypass preparation that contains a biologically-active substance at a high concentration of more than 50%, and further that the rumen-bypass property at long time dipping in a rumen may be improved by coating the rumen-bypass preparation with an aliphatic monocarboxylate.

Therefore, the present invention is directed to a rumen-bypass preparation for ruminants composed of a core preparation and a coating layer thereonto, characterized in that the core preparation contains from 50 to 90% by weight, based on the core preparation, of a biologically-active substance, that the active substance has been dispersed in from 10 to 50% by weight of a protective substance [I] as described below, and that the coating layer applied onto the core preparation is made from a substance [II] as described below.

The protective substance [I] is composed of both compounds 1) and 2), and the combination ratio by weight of the compounds 1) to 2) is in a range of from 30:70 to 10:90.

Compound 1): At least one compound selected from a group consisting of a), b) and c) specified below;
  a) Linear or branched, saturated or unsaturated aliphatic $C_{8-24}$ monocarboxylic acid;
  b) Linear or branched, saturated or unsaturated aliphatic $C_{8-24}$ alcohol containing one hydroxy group;
  c) Linear or branched, saturated or unsaturated $C_{2-8}$ di- or tri-carboxylic acid;

Compound 2): At least one material selected among linear and branched, saturated or unsaturated aliphatic $C_{12-24}$ monocarboxylates.

The protective material [II] is at least one material selected among linear and branched, saturated or unsaturated aliphatic $C_{12-24}$ monocarboxylates, polymers insoluble in the neutral region but soluble in the acidic region, and zein.

Provided, a term "% by weight" specified in the present invention means "% by dry weight", which is calculated based on a weight of a compound from which an amount of absorbed-water, that is water be eliminated from the compound by drying under an ordinary temperature at a range of from 80 to 120° C., is subtracted.

The present invention is further described in detail in the following.

The biologically-active substance used in the present invention is defined as a substance which gives any biological activity when it is applied to ruminants, and is directed to a substance that is hard to be digested and absorbed efficiently by ruminants due to its easy decomposition property in a rumen when it is administrated orally, such as amino acids including methionine and lysine hydrochloride, amino acid derivatives including 2-hydroxy-4-methylmercaptobutyric acid and the salts thereof, vitamins including nicotinic acid, nicotinic acid amide, vitamin A and vitamin E, saccharides including grape sugar and fruit sugar, various veterinary drugs including antibiotics and anthelmintics.

The biologically-active substance may be used either alone or in a combination of 2 or more of them in the rumen-bypass preparation.

The amount in total of the biologically-active substance to be contained is in a range of from 50 to 90% by weight based on the core preparation, and more preferably in a range of from 60 to 85% by weight.

It is less economical if the amount of the substance be less than this range, while the rumen-bypass property deteriorates and the manufacturing of the preparation becomes difficult when the amount of the substance is more than this range.

The protective substance used in the present invention substantially comprises a fatty acid salt and either of an aliphatic (mono-, di- or tri-)carboxylic acid or an aliphatic alcohol. The amount of the protective substance to use is subjected to both the amount of the biologically-active substance and the amount of a reforming agent that may be added when appropriate, but an adequate amount could be determined in a range of from 10 to 50% by weight based on the core preparation. The fatty acid salt is called as "bypass fats and oil" as well, which has a property not to be decomposed in a rumen but to be digested in a digestive organs from the fourth stomach onward and is the main component of the protective substance in the preparation. The amount of the fatty acid salt to use is in a range of from 70 to 90% by weight based on the protective substance. Out of this range, it is not possible to get a rumen-bypass preparation which can contain a biologically-active substance at a high concentration and can assure excellent rumen-bypass property.

The fatty acid salt used in the present invention is a salt of linear or branched, saturated or unsaturated aliphatic $C_{12-24}$ monocarboxylic acid. If the number of the carbon atoms is less than the above range, rumen-bypass property of the preparation will be deteriorated, while digestion capability in digestive organs from the fourth stomach onward will decline when the number is more than that range. As examples for said aliphatic monocarboxylic acids, lauric acid, palmitic acid, myristic acid, stearic acid, oleic acid, linolic acid and linolenic acid can be given, and one or more of these aliphatic monocarboxylic acids can be used for the inventive preparation. Particularly, a mixture of acids which are originated in animals or plants, such as fatty acids obtained from palm oil or beef tallow, is preferable from commercial availability point of view.

As examples for the fatty acid salts, calcium salts, magnesium salts, aluminium salts and zinc salts of aliphatic monocarboxylic acids containing carbon atoms in a range described above can be given, however, it is preferable to used any one of the calcium salts.

In the present invention, it is preferable to use a highly-purified fatty acid salt as the protective substance [I] of which purity in the solid component (hereinafter abbreviated as "the purity") be preferably more than 90%. The purity used here is defined as a proportion of insoluble residue obtained after an extraction of said fatty acid salt according to a customary analytical method for fats and oil with a solvent, such as ethers and ketones, which is calculated by subtracting the amount of absorbed water therefrom. In this extraction, however, it is necessary to use a solvent which does not dissolve said fatty acid salt but can dissolve fats and oil contained in the salt.

It is preferable that the amount of a base, such as calcium, contained in the fatty acid salt can remain at a level of approximately equivalent or excess in term of physical property, such as hardness. In case that the base is calcium salt, it is preferable to contain the base at a rate of from 7 to 12% by weight as the content of calcium, and preferably from 7 to 10% by weight. For quantitative analysis of calcium, a known analytical method can be employed, however, the quantity of calcium is normally determined by incinerating the fatty acid salt and consequently analyzing the amount of calcium contained in the ash obtained.

Fatty acid obtained from beef tallow and palm oil, which are usable as a raw material for the fatty acid salt, normally contain triglycerides at a rate ranging from 5 to 40%, and other compounds, such as reaction controlling agents and stabilizers, are further added thereto sometime. The compounds may remain in the reacted-product of fatty acid salt as unreacted components and those compounds become the impurities for the fatty acid salt. Some of the fatty acid salts commercially available contain impurities of more or less 20%. In a highly-concentrated formulation, such impurities work to deteriorate both of the rumen-bypass property and the hardness of the preparation, and therefore, it is preferable to use highly-purified fatty acid salts.

Aliphatic carboxylic acids and aliphatic alcohols used as the protective substance of the present invention together with said fatty acid salt are considered as a component to improve the compatibility between the biologically-active substance and the protective matrix as well as a component to reduce the degree of crystallization of the fatty acid salt, and it is preferable to use these carboxylic acids and alcohols at a rate being compatible to the fatty acid salt. Concerning the melting point of these carboxylic acids and alcohols, there is a tendency that the melting point is preferably close to ruminant's body temperature. The amount range to incorporate these carboxylic acid or alcohol into the preparation is between 10 to 30% by weight based on the protective substance. Out of this range, it is difficult to prepare the preparation with assuring good rumen-bypass property.

The number of carbon atoms contained in an aliphatic monocarboxylic acid used in the present invention is in a range of from 8 to 24, and preferably from 12 to 18. If using such acid containing less carbon atoms, the preparation becomes soft and it looses good rumen-bypass property, while the digestion capability in digestive organs from the fourth stomach onward deteriorate when using the aliphatic monocarboxylic acid containing carbon atoms in more than that range.

As examples for such aliphatic monocarboxylic acids, caprylic acid, capric acid, lauric acid, myristic acid, palmitic acid, palmitoleic acid, stearic acid, oleic acid, linolic acid, linolenic acid, behenic acid, hydrogen-added fatty acids of castor oil, and the mixtures thereof, can be given. Most of aliphatic monocarboxylic acids commercially available are saponificated and purified oil originated from animals and vegetables.

The number of carbon atoms contained in an monovalent aliphatic alcohol having one hydroxy group used in the present invention is preferably in a range of from 8 to 24, and more preferably from 12 to 18, since softening of the preparation and reduction in rumen-bypass property are recognized when the number of carbon atoms is less than that range, while deterioration in the degree of digestion in digestive organs from the fourth stomach onward is observed when the number of carbon atoms is more than that range.

As examples for the aliphatic alcohols used in the present invention, octanol, nonanol, decanol, undecanol, lauryl alcohol, myristic alcohol, cetyl alcohol, stearyl alcohol, eicosanol, docosanol, dodecenol, fiseteryl alcohol, zoomaryl alcohol, oleyl alcohol, gadoleyl alcohol and the isomers thereof, can be given.

The number of carbon atoms of the aliphatic di- or tri-carboxylic acid used in the present invention is preferably in a range of from 2 to 8, and more preferably from 2 to 6, and it is difficult to prepare the preparation having good physical property by using such acid which contains carbon atoms out of that range.

As examples for said aliphatic di- or tri-carboxylic acids, oxalic acid, malonic acid, succinic acid, glutaric acid, adipic acid, pimelic acid, suberic acid, malic acid, citric acid and the like can be given.

In the present invention, wax, such as rice wax, carnauba wax and beeswax, ethyl cellulose, propyl cellulose, polyethylene, chitosan and their derivatives, various polymers such as pH-sensitive polymers, powder of organic materials, and various additives, such as stabilizers and perfumes, can be added to the preparation as an improving agent for any of the preparation-forming properties, the mechanical intensity and other properties when appropriate. In addition, it is also possible to improve the property of the preparation by coating it with such improving agent.

For the manufacturing of the rumen-bypass preparation specified in the present invention, various known methods for granulation can be employed. However, it is preferable to employ extruding granulation method, and wherein it is further preferable to respectively subject the preparation to quenching treatment immediately after both processes of evacuation and granulation by using either water or cool wind in order to obtain a preparation with less voids and less water content.

Although there is no limitation in the shape of the preparation to manufacture, it is possible to make it into granules with less corners, namely, any of globular, elliptic, cannonball-shaped, and cylindrical shapes. Regarding the size of the preparation, any size appropriate for the use as feed can be selected, however, it is preferable to select a size in a range of from 0.5 to 10 mm in both diameter and length, which are classified into a standard category of granules or pellets.

As the fatty acid salt [I] to be used for the coating layer specified in the present invention, ones similar to the fatty acid salts used for the protective substance [I] as described above can be exemplified, and the same fatty acid salts used as the protective substance for the core preparation are preferably used although it is not always required to be the identical salts.

Further, as examples for the polymers and zeins, which is insoluble in the neutral region but soluble in the acidic region, cellulose derivatives, such as benzylaminomethyl cellulose, dimethylaminomethyl cellulose, piperidylethylhydroxyethyl cellulose, cellulose acetate diethylaminoacetate, cellulose acetate and dibutylaminohydroxypropyl ether, polyvinyl derivatives, such as vinyldiethylamine-vinyl acetate copolymer, vinylbenzylamine-vinyl acetate copolymer, polyvinyldiethylaminoacetoacetal, vinylpiperidylacetoacetal-vinyl acetate copolymer, polyvinylacetaldi ethylaminoacetate, polydimethylaminoethylmetacrylate, polydiethylaminomethylstyrene, polyvinylethylpyridine, vinylethylpyridine-styrene copolymer, vinylethylpyridine-acrylonitrile copolymer, methylvinylpyridi ne-acrylonitrile copolymer and methylvinylpyridine-styrene copolymer, chitosan, metal salts of calcium alginate and the like, water-insoluble metal salts of acids being less acidic than hydrochloric acid and acceptable for living organisms, such as calcium carbonate, calcium tertiary phosphate, calcium diphosphate, magnesium tertiary phosphate, zinc phosphate, aluminium phosphate, calcium silicate, calcium diphosphate, magnesium carbonate, lead carbonate and cobalt carbonate, can be given.

As a method for forming a coating layer, a method to admix a fatty acid salt in powder with a core preparation obtained by extruding granulation method and then to subject the resulting mixture to heating while stirring in a rotary vessel can be given as an example. The heating temperature should be higher than the softening point (melting point) of the core preparation and lower than the softening point (melting point) of the fatty acid salt. If the heating temperature is lower than this range, sufficient adhesion of the fatty acid salt in powder is not attainable, besides formation of a coating layer becomes difficult when the heating temperature is higher than this range due to causing adhesion between the particles with each other and further between the particles and the vessel.

The amount of the fatty acid salt to be a coating layer is preferably in a range of from 2 to 20 parts by weight based on 100 parts by weight of the core preparation, and more preferable from 3 to 15 parts by weight based thereon. The upper limit of the amount of the coating layer shall be determined from the property of the preparation and the fatty acid salt, respectively, and the amount of the fatty acid salt to be adhered will not exceed a certain level. It is not a problem that excess amount of the fatty acid salt in powder which does not adhere may remain on the coating layer.

As suitable particle size of the fatty acid salt in powder, it is preferable to be 50 mesh pass, and more preferably 100 mesh pass.

Best Mode for Carrying Out the Invention

The present invention is further described in detail with referring to the following embodiments and comparison examples.

However, the scope of the present invention should not be limited to the extent described in the following examples.

Comparison Examples 1

28 parts by weight (hereinafter abbreviate as "parts", of calcium salt of beef tallow fatty acid (purity: 97.3%), 7 parts of palmitic acid and 65 parts of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing the pieces at a room temperature to thereby obtain a rumen-bypass preparation in approximately cylindrical shape having an average diameter of 2 mm and an average length of 2 mm.

Comparison Example 2

25 parts of calcium salt of palm oil fatty acid (purity: 94.9%), 5 parts of lauric acid and 70 parts of methionine were admixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a preparation in cannonball-shape having an average maximum diameter of 1.2 mm and an average length of 1.2 mm. After subjecting the preparation to a centrifuge, the preparation was subjected to drying by blowing it under a room temperature to obtain a desired rumen-bypass preparation.

Comparison Examples 3

23 parts of calcium salt of beef tallow fatty acid (purity: 97.3%), 4 parts of palmitic acid, 71 parts of methionine and 1 part of ethyl cellulose were mixed. The mixture was placed in a hopper of a double-shaft extruding granulator and was extruded in fused state through a die with a diameter of 1.6 mm while subjecting it to evacuation. Then, the mixture extruded was cut with a water-cooled cutter to obtain a preparation in approximately round shape having an average diameter of 1.6 mm and an average length of 1.6 mm. After subjecting the preparation to a centrifuge, the preparation was dried for 16 hours at 40° C. to obtain a desired rumen-bypass preparation.

Comparison Example 4

32 parts of calcium salt of palm oil fatty acid (purity: 97.1%), 5 parts of myristic acid, 62.5 parts of methionine and 0.5 part of vitamin E acetate were admixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a preparation in approximately round shape having an average diameter of 1.2 mm and an average length of 1.2 mm. The preparation was then mixed with 1 part of born meal based on 100 parts of the preparation, and the resulting mixture was passed through a rotary kiln maintained at 50° C. for 40 min. and then cooled down to a room temperature by blowing cool wind to it to obtain a desired rumen-bypass preparation.

Comparison Example 5

20 parts of calcium salt of palm oil fatty acid (purity: 94.0%), 4 parts of lauric acid, 1 part of glyceryl monostearate, 65 parts of methionine and 10 parts of lysine hydrochloride were admixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a preparation in approximately round shape having an average diameter of 1.2 mm and an average length of 1.2 mm. The preparation was then passed through a rotary kiln maintained at 50° C. for 50 min. and then cooled down to a room temperature by blowing cool wind to it to obtain a desired rumen-bypass preparation.

EXAMPLE 1

By crushing calcium salt of beef tallow fatty acid, powder thereof [A] with particle size of 100 mesh pass was obtained. 200 parts of the preparation prepared in the comparison example 1 and 20 parts of the powder [A] were placed in a 10 liter flask, and the resulting mixture was heated up to 90° C. while rotating the flask to adhere the powder [A] onto the surface of the preparation for forming a coating layer.

EXAMPLE 2

200 parts of the preparation prepared in the comparison example 2 and 26 parts of the powder [A] were placed in a 10 liter flask, and the resulting mixture was heated up to 90° C. while rotating the flask to adhere the powder [A] onto the surface of the preparation for forming a coating layer.

EXAMPLE 3

By crushing calcium salt of palm oil fatty acid, powder thereof [B] with particle size of 100 mesh pass was obtained. The preparation prepared in the comparison example 3 and the powder [B], both in the same amount as mentioned in the example 1, were placed in a 10 liter flask, and the resulting mixture was heated up to 85° C. according to the same process as described in the example 1 to adhere the powder [B] onto the surface of the preparation for forming a coating layer.

EXAMPLE 4

By crushing calcium salt of palm oil fatty acid, powder thereof [B] with particle size of 100 mesh pass was obtained. The preparation prepared in the comparison example 4 and the powder [B], both in the same amount as mentioned in the example 1, were placed in a 10 liter flask, and the resulting mixture was heated up to 85° C. according to the same process as described in the example 1 to adhere the powder [B] onto the surface of the preparation for forming a coating layer.

EXAMPLE 5

By crushing calcium salt of stearic acid, powder thereof [C] with particle size of 150 mesh pass was obtained. 100 parts of the preparation prepared in the comparison example 5 and 8 parts of the powder [C] were placed in a 10 liter flask, and the resulting mixture was heated up to 85° C. according to the same process as described in the example 1 to adhere the powder [C] onto the surface of the preparation for forming a coating layer.

The results are shown in Tables 1 and 2. Assessment of the results was conducted according to the following criteria.

Concentration of Calcium contained in Fatty Acid Salt

After incinerating 1 g of fatty acid salt at 550° C., the ash obtained was dissolved in hydrochloric acid, diluted and quantitatively analyzed by using an emission spectrochemical analyzer (ICP) to determine calcium concentration in the fatty acid salt based on dry weight of said fatty acid salt.

Hardness

The hardness of the preparation was measured by using a hardness tester for tablets. The hardness was expressed with a value of loading pressure at which the preparation starts to destroy.

The performance of the preparation was also evaluated based on its solubility in imitative solutions as described hereinbelow maintained at 40° C. by dipping the preparation into each of the solutions in turn.

Eluting Ratio in Rumen

This ratio is to evaluate eluting property of the preparation in a rumen of cows, and which is a ratio of the amount of a biologically-active substance, that eluted into the imitative gastric juice of a rumen when the preparation was dipped while shaking for 16 hours in said gastric juice prepared at a pH value of 6.4, based on the amount of the biologically-active substance originally contained in the preparation.

Eluting Ratio in the Fourth Stomach

After measured the eluting ratio in a rumen, the solid product obtained was separated and consequently dipped into imitative gastric juice of the fourth stomach of cows prepared at a pH value of 2.0. After 2 hours shaking, the ratio of the amount of the biologically-active substance eluted into the gastric juice based on the amount of the biologically-active substance originally contained in the preparation was determined to evaluate the elution property of the preparation in the fourth stomach.

Eluting Ratio in Gastric Juice of Small Intestine

After measured the eluting ratio in the fourth stomach, the solid product obtained was separated and consequently dipped into imitative gastric juice of small intestine of cows prepared at a pH value of 8.2.

After 4 hours shaking, the ratio of the amount of the biologically-active substance eluted into the gastric juice based on the amount of the biologically-active substance originally contained in the preparation was determined to evaluate the elution property of the preparation in small intestine.

Imitative Gastric Juice of Rumen

This imitative solution is to substitute gastric juice of a rumen of cows, which is prepared by dissolving 2.5 g of disodium hydrogenphosphates and 6.7 g of dipotassium hydrogenphosphate into water and then adjusting the volume with water to a final volume of 1 liter, of which pH value is 6.4.

Imitative Gastric Juice of the Fourth Stomach

This imitative solution is to substitute gastric juice of the fourth stomach of cows, which is prepared by adding 50 ml of 0.2-N potassium chloride and 10 ml of 0.2-N hydrochloric acid to water and then adjusting the volume with water to a final volume of 200 ml, of which pH value is 2.0.

Imitative Gastric Juice of Small Intestine

This imitative solution was prepared by dissolving 9.8 g of sodium hydrogencarbonate, 0.57 g of potassium chloride, 9.30 g of disodium phosphate $12H_2O$, 0.47 g of sodium chloride, 0.12 g of sodium sulfate heptahydrates, 0.05 g of cow bile powder and 0.05 g of lipase in water and consequently adjusting the volume with water to a final volume of 1 liter, of which pH value is 8.2.

Nylon Bag (NB) Test

Samples of the preparations, which were filled in a 600 mesh nylon bag, were dipped in a rumen of two Holstein cows (Weight 600 kg, fed with Lucerne and assorted feed) wearing a rumen fistel for a fixed time, respectively, and eluting ratio of methionine was calculated from the difference in the concentration of methionine in the preparation before an after the dipping.

TABLE 1

Results of Assessment on Eluting Ratio (Examples)

| Example No. | | | Example 1 | Example 2 | Example 3 | Example 4 | Example 5 |
|---|---|---|---|---|---|---|---|
| Preparation | Appearance | | Cylindrical | Cannonball | Cylindrical | Cylindrical | Cylindrical |
| | External Diameter - Length (min) | | 2.0–2.0 | 1.2–1.2 | 1.6–1.6 | 1.2–1.2 | 1.2–1.2 |
| | Biologically-Active | Type | Methionine | Methionine | Methionine | Methionine/Vitamin E | Methionine/Lysine salt |
| | Substance | Concentration (%) | 65 | 70 | 71 | 62.5/0.5 | 65/10 |
| | Hardness | | 330 | 350 | 290 | 340 | 330 |
| Protective Substance | (1) Aliphatic Carboxylic Acid | | Palmitic acid | Lauric acid | Palmitic acid | Myristic acid | Lauric acid |
| | (2) Ca salt of Fatty Acid | | | | | | |
| | Raw Material Fatty Acid | | Cow tallow | Palm oil | Cow tallow | Palm oil | Palm oil |
| | Ca Concentration | | 8.3 | 7.4 | 8.3 | 7.9 | 7.4 |
| | Purity | | 97.3 | 94.0 | 97.3 | 97.1 | 94.0 |
| | (1):(2) | | 20:80 | 17:83 | 15:85 | 14:86 | 17:83 |
| After Coating | Amount of Coating Layer (%) | | 10 | 13 | 10 | 10 | 8 |
| | Methionine Concentration (%) | | 59 | 62 | 65 | 57 | 59 |
| Assessment on Eluting Ratio | a) Eluting Ratio f/m Rumen (%) 16H | | 6 | 7 | 7 | 5 | 9 |
| | b) Eluting Ratio f/m Fourth stomach (%) 2H | | 9 | 11 | 9 | 30 | 37 |
| | c) Eluting Ratio f/m Small Intestine (%) 4H | | 71 | 69 | 63 | 41 | 39 |
| NB | Eluting Ratio after 16H (%) | | 5 | 7 | 8 | 5 | 9 |
| | Eluting Ratio after 24H (%) | | 9 | 12 | 13 | 11 | 16 |

TABLE 2

Results of Assessment on Eluting Ratio (Comparison Examples)

| Example No. | | | Comparison Example 1 | Comparison Example 2 | Comparison Example 3 | Comparison Example 4 | Comparison Example 5 |
|---|---|---|---|---|---|---|---|
| Preparation | Appearance | | Cylindrical | Cannonball | Cylindrical | Cylindrical | Cylindrical |
| | External Diameter - Length (mm) | | 2.0–2.0 | 1.2–1.2 | 1.6–1.6 | 1.2–1.2 | 1.2–1.2 |
| | Biologically-Active | Type | Methionine | Methionine | Methionine | Methionine/Vitamin E | Methionine/Lysine salt |
| | Substance | Concentration (%) | 65 | 70 | 71 | 62.5/0.5 | 65/10 |
| | Hardness | | 330 | 350 | 290 | 340 | 330 |

TABLE 2-continued

Results of Assessment on Eluting Ratio (Comparison Examples)

| Example No. | | Comparison Example 1 | Comparison Example 2 | Comparison Example 3 | Comparison Example 4 | Comparison Example 5 |
|---|---|---|---|---|---|---|
| Protective Substance | (1) Aliphatic Carboxylic Acid | Palmitic acid | Lauric acid | Palmitic acid | Myristic acid | Lauric acid |
| | (2) Ca salt of Fatty Acid | | | | | |
| | Raw Material Fatty Acid | Cow tallow | Palm oil | Cow tallow | Palm oil | Palm oil |
| | Ca Concentration | 8.3 | 7.4 | 8.3 | 7.9 | 7.4 |
| | Purity | 97.3 | 94.0 | 97.3 | 97.1 | 94.0 |
| | (1):(2) | 20:80 | 17:83 | 15:85 | 14:86 | 17:83 |
| Assessment on Eluting Ratio | a) Eluting Ratio f/m Rumen (%) 16H | 8 | 9 | 10 | 5 | 12 |
| | b) Eluting Ratio f/m Fourth Stomach (%) 2H | 11 | 23 | 10 | 55 | 43 |
| | c) Eluting Ratio f/m Small Intestine (%) 4H | 66 | 58 | 60 | 28 | 31 |
| NB | Eluting Ratio after 16H (%) | 12 | 11 | 14 | 10 | 15 |
| | Eluting Ratio after 24H (%) | 23 | 21 | 25 | 22 | 28 |

Industrial Use

As understandable from the comparison between the examples in Table 1 and the comparison examples in Table 2, the rumen-bypass preparations of the present invention prepared according to the examples 1 through 5 have a low eluting ratio of imitative gastric juice from a rumen, respectively, and have good rumen-bypass property. In particular, from the small eluting ratio after 24 hours dipping in a rumen, it is obvious that rumen-bypass property over a long time has been improved. Although an eluting ratio of gastric juice from the fourth stomach is reduced in the examples, it is also obvious that digesting and absorbing capability is not deteriorated since total eluting ratio with imitative gastric juice from small intestine is almost the same.

As described above, by using a protective substance comprising a fatty acid salt and either an aliphatic carboxylic acid or a monovalent aliphatic alcohol at a certain specific composition ratio, a matrix-type rumen-bypass preparation containing a biologically-active substance at a high concentration of more than 50% and having excellent rumen-bypass property, can be prepared. Further, by providing a coating layer consisting of a fatty acid salt onto the surface of the preparation, it is allowable to provide a rumen-bypass preparation of which eluting ratio during dipping for a long time is improved.

What is claimed is:

1. A rumen-bypass preparation for ruminants comprising:
    a core preparation,
        said core preparation containing from 50% to 90% by weight of said core preparation a biologically-active substance,
        said biologically active substance being dispersed in from 10% to 50% by weight of a protective substance,
        said protective substance containing a first substance and a second substance in a ratio of said first substance to said second substance of from 30:70 to 10:90,
        said first substance containing at least one selected from the group consisting of a linear or branched, saturated or unsaturated aliphatic $C_{8-24}$ monocarboxylic acid, a linear or branched, saturated or unsaturated aliphatic $C_{8-24}$ alcohol, and a linear or branched, saturated or unsaturated aliphatic $C_{2-8}$ di- or tri-carboxylic acid,
        said second substance containing at least one of a linear or branched, saturated or unsaturated aliphatic $C_{12-24}$ monocarboxylate; and
    a coating layer applied onto said core preparation,
        said coating layer containing at least one selected from the group consisting of a linear or branched, saturated or unsaturated aliphatic $C_{12-24}$ monocarboxylate, polymers being insoluble in a neutral pH but soluble in an acidic pH, and zein.

2. The rumen-bypass preparation according to claim 1, wherein the biologically-active substance is an amino acid.

3. The rumen-bypass preparation according to claim 2, wherein the biologically-active substance is at least one selected from methionine and lysine hydrochloride.

4. The rumen-bypass preparation according to claim 1, wherein the biologically-active substance is at least one selected from 2-hydroxy-4-methylmercaptolactic acid and the salts of 2-hydroxy-4-methylmercaptolactic acid.

5. The rumen-bypass preparation according to claim 1, wherein said linear or branched, saturated or unsaturated aliphatic $C_{8-24}$ monocarboxylic acid in said protective substance is at least one selected from lauric acid, palmitic acid, palmitoleic acid, myristic acid, stearic acid, oleic acid, and linolic acid.

6. The rumen-bypass preparation according to claim 1, wherein said linear or branched, saturated or unsaturated aliphatic $C_{12-24}$ monocarboxylate in said protective substance is a calcium salt.

7. The rumen-bypass preparation according to claim 6, wherein the content of calcium in said aliphatic $C_{12-24}$ calcium monocarboxylate is from 7% to 12% by weight based on the weight of said calcium monocarboxylate.

8. The rumen-bypass preparation according to claim 1, wherein said linear or branched, saturated or unsaturated aliphatic $C_{12-24}$ monocarboxylate of said protective substance is a highly-purified aliphatic monocarboxylate with a purity of more than 90%.

9. The rumen-bypass preparation according to claim 1, wherein said coating layer is from 2 parts to 20 parts by weight based on 100 parts by weight of said core preparation.

* * * * *